United States Patent
Maberry et al.

(10) Patent No.: US 6,955,220 B2
(45) Date of Patent: Oct. 18, 2005

(54) PROCESS OF WELL CEMENTING IN COLD ENVIRONMENT

(75) Inventors: Jack Maberry, Katy, TX (US); Greg Garrison, Katy, TX (US); Stephan Harris, Mandeville, LA (US); Andre Garnier, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 10/029,333

(22) Filed: Dec. 21, 2001

(65) Prior Publication Data

US 2003/0173083 A1 Sep. 18, 2003

(51) Int. Cl.⁷ .............................................. E21B 33/13
(52) U.S. Cl. ...................... 166/292; 166/293; 166/901; 106/713
(58) Field of Search ................................ 166/292, 293, 166/294, 901; 106/713, 724, 727, 729

(56) References Cited

U.S. PATENT DOCUMENTS

| | | | | |
|---|---|---|---|---|
| 3,179,528 A | * | 4/1965 | Holmgren et al. | 166/293 |
| 3,926,257 A | * | 12/1975 | Marrast et al. | 166/293 |
| 4,482,379 A | * | 11/1984 | Dibrell et al. | 166/292 |
| 4,818,288 A | * | 4/1989 | Aignesberger et al. | 166/293 |
| 4,936,384 A | * | 6/1990 | Sugama | 166/283 |
| 5,340,385 A | | 8/1994 | Arfaei et al. | 106/14.05 |
| 5,348,583 A | * | 9/1994 | Arfaei et al. | 106/696 |
| 5,641,352 A | * | 6/1997 | Jeknavorian et al. | 106/808 |

FOREIGN PATENT DOCUMENTS

| | | |
|---|---|---|
| EP | 0 554 046 | 8/1993 |
| WO | 00 29351 | 5/2000 |

OTHER PUBLICATIONS

"CEITEC Evaluation Plan for Low Temperature Concrete Admixtures" (http://www.cerf.org/pdfs/ceitec/lowtemp/plan.pdf) accessed Apr. 25, 2003.*
PolarSet® Product Information brochure, W.R. Grace and Co. published Mar. 2001.*
PolarSet® Material Safety Data Sheet Dec. 4, 2001.*

* cited by examiner

*Primary Examiner*—John Kreck
(74) *Attorney, Agent, or Firm*—David Cate; Tim Curington; Robin Nava

(57) ABSTRACT

The present invention provides improved well cementing methods for use in cold environment, where the circulating temperature of the cement is typically within the range of 5 to 20° C. The improved well cementing methods include forming compositions that are essentially comprised of an aqueous fluid, a hydraulic cement binder and a set-accelerating admixture comprising an alkali or alkaline earth metal nitrate and an alkali or alkaline earth metal nitrite.

19 Claims, 1 Drawing Sheet

PROCESS OF WELL CEMENTING IN COLD ENVIRONMENT

FIELD OF THE INVENTION

The present invention relates to well cementing methods and more particularly, to compositions for use in cold subterranean environment, as encountered for instance in deep water offshore wells.

BACKGROUND OF THE INVENTION

After drilling a well, such as an oil or gas well, a casing is commonly lowered into the wellbore. Cement slurry is then pumped downhole trough the casing and back up into the annulus between the casing and the borehole. Upon setting, the slurry forms a cement sheath that holds the casing in place, stabilizes and protects the casing. In addition, the cement sheath provides zonal isolation. It is thus critical to prevent upward fluid flow, such as gas migration or water flows, through and along the cement sheath fluid and to prevent exchange between and among formation layers through which the wellbore passes.

Hydraulic cements set and develop compressive strength as a result of hydration of different cement phases. Although this is a continuous process, three main phases can arbitrarily be defined. In the first phase, the cement slurry has a relatively low viscosity and essentially constant Theological properties. This first phase corresponds to the pumping and placement of the cement downhole. In the second phase, the consistency of the cement increases so that it becomes difficult to pump and place it correctly. However, the developed compressive strength is not enough for the cement to be self-supported and to withstand a significant strength. In the third and last phase, the cement continues to develop compressive strength but the well security is insured and the well construction may be resumed.

From a gas migration point of view, it should also be noted that during the first phase, the hydrostatic pressure of the height of cement slurry is high enough to compensate formation gas pressure. Set cement is gas-tight so that if the placement of the cement was adequately performed, no gas migration should occur. However, during the transition phase, gas percolation within the gelling slurry can occur unless the cement slurry is specifically designed and includes for instance gas migration additives such as lattices.

The second phase- or transition phase—is thus not only essentially a waste of time (and consequently of money) but also a period during which the risk of a major accident such as a blow-off is at its maximum. This is why so-called Right-Angle-Set (RAS) cements have received particular attention. RAS cement slurries are defined as well-dispersed systems that show no gelation tendency and set very rapidly due to rapid hydration kinetics; in other words, RAS slurries exhibit a very short transition time.

Due to cement hydration kinetics, designing RAS slurries for temperatures below 120° C. is difficult. The cooler the temperature, the longer the cement set. Therefore, it is especially difficult to design a cement slurry suitable for cold environment such as offshore wells. In deep water wells, temperatures at seabottom are as low as about 4° C., and even lower in arctic zones so that the circulating temperature of the cement typically ranges between 4° C. and 20° C.

This problem of low temperature has been addressed by developing formulations based on specific hydraulic binders. These formulations are essentially divided into two classes: formulations based on gypsum (Plaster) or more exactly on gypsum/Portland cement blend and formulations based on aluminous cement. The performance of aluminous cements might be severely affected by contamination with Portland cements and consequently, they must be stored in separate silos. Therefore, due to logistical reasons, formulations based on plaster have received more attention. Nevertheless, it would be desirable to be able to use more conventional—and less expensive—formulations similar to those used for cementing the deeper part of the well, which are subject to higher temperature due to the thermal geodesic gradient.

According to standard practice, cement slurries are usually formulated with conventional additives including for instance set retarders or set accelerators, dispersing agent and fluid loss control additives. As described, for example, in Well Cementing, edited by E. I. Nelson, Schlumberger Educational Services (1990), an accelerating action has been reported for many inorganic salts including chlorides, carbonates, silicates, aluminates, nitrates, nitrites, sulfates, thiosulfates and alkaline bases such as sodium, potassium and ammonium hydroxydes. Among these, calcium chloride is by far the most common set accelerator used for Portland cement.

However, calcium chloride has several side effects that are not beneficial. Calcium chloride affects the rheological properties of the slurry resulting in an increase of the viscosity. Calcium chloride also has a deterrent impact as to the permeability of the set cement. Lower permeability is not desirable in controlling gas migration and the resistance of the cement to sulfate brines is decreased.

Various other additives or combinations of known additives have been developed for the construction industry, aiming at providing mortars to allow concrete placement at ambient temperature under cold or sub freezing weather. In particular, chloride-free set-accelerating admixtures, based on alkali or alkaline earth metal salt nitrate, nitrite, formate or acetate, have been commercialized. However, it is well known that well cementing exposes Portland cement to conditions far different from those encountered in civil engineering where the specifications with regard to rheological properties, gas migration control and fluid loss control are absent or at least dramatically different.

It is thus an object of the present invention to provide new well cementing formulations that set rapidly at lower temperatures, i.e. below 20° C. and more preferably below 10° C., and that show superior performance over the prior art formulations.

SUMMARY OF THE INVENTION

The present invention provides improved well cementing compositions for use in cold environment, where the circulating temperature of the cement is typically within the range of about 5° C. to about 20° C. The improved well cementing compositions are essentially comprised of an aqueous fluid, a hydraulic cement binder and a set-accelerating admixture comprising an alkali or alkaline earth metal nitrate and an alkali or alkaline earth metal nitrite.

The invention involves the use of an admixture of nitrate and nitrite salt to enhance gel strength and compressive strength development. Calcium salts are particularly preferred. A ratio of about 1:1 is preferred but a range of weight ratios of from about 1:3 to about 3:1 may be used. The mixture is usually added as a liquid additive, the salts being mixed in water to prepare the liquid.

The set-accelerating control additive may further be formulated to include low molecular weight glycols such as C2 to C6 aliphatic di- and tri-hydric glycols such as ethylene glycol, diethylene glycol, propylene glycol and glycerol for instance. The glycol is typically added into the admixture in the range of 0 and 30 weight percent, most preferably between about 5 and about 15 weight percent, based on the total weight of solids in the admixture.

According to a preferred embodiment, the set accelerating control additive of the present invention may also comprise at least a di- or tri-hydroxyalkyl amine. Particularly preferred are alkanolamine of the formula:

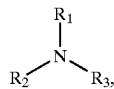

where R1 and R2 are hydroxyalkyl groups in C1–C4, and R3 is a C1–C5 alkyl groups, such as methyl or ethyl diethanolamine. The amount of alkanolamine preferably ranges between 0 and 6 weight percent, based on the total weight of solids in the admixture, and most preferably, between 2 and 4 weight percent.

The formulation may also comprise minor amounts of other alkali or alkaline earth metal salts such as alkali or alkaline earth metal chloride, bromide, iodide, cyanide, silicate and hydroxide, and in particular, a minor amount of calcium bromide.

According to a most preferred embodiment of the present invention, the set admixture of the present invention consists of calcium nitrate, calcium nitrite, diethylene glycol, methyldiethanolamine and calcium bromide in a proportion of 42:42:10:3:3 by weight in water, with a solid content between 45 and 50%.

The set admixture is typically added to the cement composition in an amount that provides a salt concentration (essentially calcium nitrate and calcium nitrite as explained above) between about 3 and about 20 g per kg of cement. With the preferred formulation mentioned above, this results in concentration of the set-admixture ranging between about 4 and about 45 $cm^3$ per kg of cement.

The term "hydraulic cement binder" as used herein refers to any class of API Portland cement as defined by the American Petroleum Institute (API) with the exception of the classes D, E and F intended for use under high temperatures and any of the types I, II, III and V defined by the American Society for Testing and Materials (ASTM). Special grinds of cement such as microfine cement and fine grind lightweight type cements and/or shale mixtures may be used.

In contrast to some conventional formulations, any suitable aqueous fluid may be used as mixing water. As used herein, the phrase "aqueous fluid" is understood to include fresh water, salt water, seawater, or brine. The aqueous fluid is present in the composition in an amount sufficient to form a slurry that can be pumped downhole. Typical concentrations of aqueous fluid may range from 30 to 100% by weight of cement. Generally, the amount of aqueous fluid is such that the density of the slurry ranges between about 0.9 and 3 $g/cm^3$ [about 8 and 25 ppg (pounds per gallon)], and most typically between 12 and 16.4 ppg. For lower density, i.e. in the 8 to 12 ppg range, the formulation according to the invention may be foamed by the addition of suitable foaming agents, foam stabilizing agents and an inert gas such as nitrogen and/or air. Concentrations of foaming agents range generally from about 0.5% to about 5% by weight of composition fluid; foam stabilizing agents range from about 0.5 to 5% by weight of the composition fluid; and concentrations of gas ranging from 10% to 60% of total volume of final foamed slurry volume.

The well cementing compositions of the present invention may also include other additives such as fluid loss control additives, gas migration control additives, dispersants, and other additives commonly used in cement slurries. Examples of fluid loss and gas control additives include derivations of polyvinyl alcohol, polyvinyl pyrrolidone, and latex polymer dispersions such as copolymers of styrene and butadiene. Typical concentrations for such additives can range from about 0.1% to 4% by weight of cement. Dispersants are used to reduce the slurry viscosity and allow the cement to lower the water requirement for mixing the cement. Typical concentrations range from about 0.01% to 1% by weigh of cement. Examples of dispersants include sodium naphthalene sulfonate or polymelamine sulfonates.

The well cementing compositions of the present invention are extremely advantageous when used in cold environment such as offshore wells in deep water (600 m below the seafloor), where the placement temperature typically range form about 5° C. to about 20° C.

BRIEF DESCRIPTION OF THE DRAWINGS

The above and further objects, features and advantages of the present invention will be better understood by reference to the appended detailed description, and to the drawings wherein.

DESCRIPTION OF PREFERRED EMBODIMENTS

Figure 1:
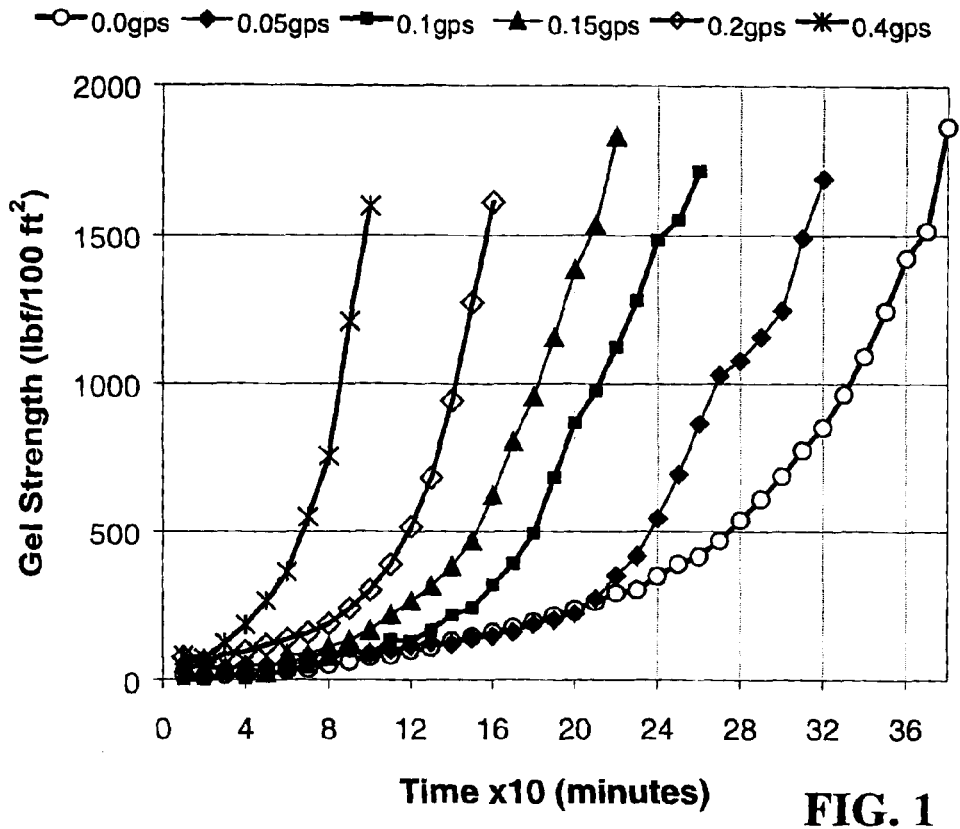
FIG. 1 shows the gel strength development at 65° F., as a function of time, of cement compositions comprising various concentration of the set-accelerative mixture of the present invention.

The following examples illustrate the invention without limiting its scope.

EXAMPLE 1

Initial Evaluation

Various cement compositions were prepared utilizing lightweight cement and commercial accelerators used for the construction industry. The tested cement available from TXI, United States and is produced by intergrinding Portland cement and a lightweight shale aggregate and has proven to be suitable for oil and gas well operations in deep water.

The water content was adjusted to achieve a density of 12.5±0.1 lbs. per gallon (12.5 ppg=1.498 $g/cm^3$). For this initial screening, several accelerators were subjected to a round of tests to determine the compressive strength achieved after 8 hours using 2 inches-molded cubes cured in a 100% humidity chamber at room temperature (approximately 75° F. or 24° C.). The concentration of accelerator is in gallons per sack of cement (i.e., 0.1 US gallons (3.78 liters) per 42 kilogram sack, 0.1 gps=9 $cm^3$/kg of cement). This concentration was based on the active cement content of the TXI Lightweight cement, excluding the inert lightweight aggregate. The tests were carried out using, calcium chloride, solutions of nitrate and/or nitrite salts, and no set additive. Based on the Material Safety Data Sheet provided by the supplier, it is assumed that the concentrations of salts in additive B, C and D are respectively 40% (20+20), 30% and 45% (by weight). The results are shown in table 1.

TABLE 1

| Additive | Chemical Composition (by weight) | Concentration | 8 hr Compressive Strength at Ambient Temperature |
|---|---|---|---|
| None | — | — | Set with no measurable strength[4] |
| A | 32% Calcium Chloride | 0.265 gal/sk | 38 psi |
| B[1] | Calcium nitrate <20% Calcium nitrite <20% Calcium Bromide <2% Diethylene glycol <5% Methylene-diethanolamine <2% | 0.151 gal/sk | 15 psi |
| B | Methylene-diethanolamine <2% | 0.302 gal/sk | 78 psi |
| C[2] | Calcium Nitrite >30% | 0.08 gal/sk | 4 psi |
| C | " | 0.6 gal/sk | 17 psi |
| D[3] | Calcium nitrate <45% | 0.141 gal/sk | Set with no measurable strength[4] |

[1]Available from W. R. Grace & Co. - Cambridge, Massachusetts, under the name "Polarset"™
[2]Available from W. R. Grace & Co. - Cambridge, Massachusetts, under the name "DCI"®
[3]Available from W. R. Grace & Co. - Cambridge, Massachusetts, under the name "Gilco Accelerator"
[4]The cube can be removed from the mold but the strength necessary to break it is not sufficient to cause a deflection of the dial.

The solution comprising both calcium nitrate and calcium nitrite shows greater acceleration than is observed with calcium chloride. Neither the solution comprising calcium nitrate nor the solution comprising calcium nitrite provided any significant compressive strength.

Admixture C of example 1 was further extensively tested to evaluate its suitability for well completion at low temperatures, including its compatibility with standard additives. Unless otherwise indicated, all tests followed recommended practices outlined in API RP 10 B.

For thickening times the consistometer chamber was ⅔ filled with oil and prechilled to approx. 65° F. The slurry was mixed as per standard API procedure, poured into the consistometer cup and placed in the chilled chamber. The lid was closed and the chamber topped off with oil. The slurry was stirred at 150 rpm with a pressure of 1500 psi applied. The chiller was adjusted to bring the slurry down to 65° F. as quickly as possible (usually 10 to 20 minutes) and then readjusted to maintain the slurry at 65° F. until the slurry set.

For testing the compressive strength, the cooling water lines for the Ultra Sonic Cement Analyzer (U.C.A.) were attached to a chiller. The cell was prechilled in the lab refrigerator to approx. 55° F. (12.7° C.) and the UCA chamber was also prechilled to 55° F. The slurry was mixed as per API, put in the cell, lowered into the UCA and pressurized to 1500 psi (10.34 MPa). Again the chiller's temperature was adjusted to bring the slurry down to 55° F. as quickly as possible (usually 10 minutes) and then readjusted to maintain a temperature of 55° F. The test duration was 24 or 48 hours. The thickening time corresponds to the production of a consistency of 100 BC, measured in standardized BC units. The transition time corresponds to passing from a consistency of 30 BC to a consistency of 100 BC. A short transition time is desirable. The time required to attain a compressive strength of 50 psi (345 kPa) and 500 psi (3450 kPa) was measured, as well as the compressive strength after 24 hours.

Rheologies were performed according to the standard API procedures, just after mixing and with slurries conditioned for 20 minutes at 80° F. The measured data include plastic viscosity (in millipascals second or centipoises) and the yield point, expressed as is customary in the art in lbf/ft2. Compositions with low viscosity and low yield point are desirable. Measurements were also carried out on the gel strength developed when the composition is left to rest for 10 minutes.

The fluid loss of the slurries was measured after 30 minutes, according to standard API procedures. Values below 100 ml, preferably below 50 ml, are associated with lower risks of gas migrations and therefore are desirable.

The vane rheometer procedure follows: after prechilling the cell, sensor zeroing and friction testing the vane rheometer; the slurry was mixed and placed in the cell. The motor speed for the vane rheometer was set at 0.1 rpm and the test cut off gel strength was the default setting of 1550 lbf/100 ft$^2$ (0.07 MPa). A pressure of approximately 400 psi (2.75 MPa) was applied to the slurry and the test was initiated. Again the cell was rapidly cooled to temperature (usually 20 to 30 minutes) and the chiller's controller readjusted to maintain the desired temperature. For the 45° F. tests the cell was chilled in the freezer for 15 minutes in order to quickly reduce it's temperature to the desired level.

Unless otherwise specified, all tests below were carried out using the set-admixture B according to the present invention.

EXAMPLE 2

Comparison with Conventional Accelerators

Cement slurries with a density of 16.4 ppg (1.96 g/cm$^3$), comprising a gas control additive, a dispersing agent and a set control additive (the admixture of the present invention or calcium chloride, either under liquid or solid form) were prepared with a Class H cement.

The rheology of the slurry and the setting properties are shown in table 2.

TABLE 2

| | | | | | |
|---|---|---|---|---|---|
| Gas control additive (gal/sk) | 0.4 | | | 0.5 | |
| Dispersant (gal/sk) | 0.04 | | | 0.06 | |
| Set control additive (gal/sk) | — | 0.4 | 0.2 | — | — |
| Liquid CaCl$_2$ (gal/sk) | 0.4 | — | — | — | — |
| CaCl$_2$ (% BWOC) | — | — | — | 1 | 2 |
| Rheology After mixing | | | | | |
| PV (cP) | 45 | 47 | 49 | 55 | 86 |
| TY (lbf/100 ft$^2$) | 12 | 9 | 3 | 3 | 22 |
| Rheology at 80° F. | | | | | |
| PV (cP) | 89 | 59 | 53 | | 90 |
| TY (lbf/100 ft$^2$) | 24 | 16 | 5 | | 12 |
| 10 minutes gel (lbf/100 ft$^2$) | 32 | 37 | | | 26 |
| Thickening Time at 55° F. and 1500 psi (hr:min) | 3:58 | 3:18 | 4:25 | 6:00 | 4:12 |
| Initial consistency (Bc) | 22 | 18 | 17 | 19 | 20 |
| Time 30–100 Bc (hr:min) | 2:42 | 1:53 | 1:43 | 3:22 | 2:41 |
| UCA at 55° F. and 1500 psi | | | | | |
| Time to reach 50 psi (hr:min) | | | 7:35 | N/A | 6:47 |
| Time to reach 500 psi (hr:min) | | | 15:47 | N/A | 16:22 |
| Compressive strength at 24 hrs (psi) | | | 1010 | 261 | 862 |

TABLE 2-continued

| | | | | |
|---|---|---|---|---|
| API Fluid Loss at room temp. (mL/30 min.) | 19 | 18 | 14 | 19 |
| Vane rheometer test at 65° F. and 400 psi | | | | |
| Time to reach 1550 psi (hr:min) | | | 2:30 | 2:20 |
| Time from 100 to 500 lbf/100 ft² (min) | | | 70 | 95 |

This shows that the set-admixture of the present invention can be used in well cementing formulations, (column 2 and 3), accelerates cement hydration and results in reduced gel times and early compressive strength, significantly improved over the prior art formulations based on calcium chloride. In addition, with the set-admixture of the present invention, the slurry rheology is not significantly affected with increased concentrations. On the other hand, increased concentrations of calcium chloride result in non-desirable increased viscosity.

EXAMPLE 3

Effect of the Concentration of the Set Additive Mixed with Fresh Water

Cement slurries with a density of 16.4 ppg (1.96 g/cm³), were prepared with a Class H Portland cement. All formulations comprise a gas control additive (0.5 gal/sk), a dispersing agent (0.06 gal/sk) and the set control additive of the present invention at various concentrations.

TABLE 3

| Set control additive (gal/sk) | 0 | 0.05 | 0.1 | 0.15 | 0.2 | 0.3 | 0.4 |
|---|---|---|---|---|---|---|---|
| Rheology After mixing | | | | | | | |
| PV (cP) | 52 | | 62 | | 49 | 55 | 55 |
| TY (lbf/100 ft²) | 5 | | 4 | | 3 | 4 | 4 |
| Rheology at 80° F. | | | | | | | |
| PV (cP) | 47 | | 64 | | 53 | 59 | 72 |
| TY (lbf/100 ft²) | 7 | | 5 | | 5 | 12 | 3 |
| 10 minutes gel (lbf/100 ft²) | 14 | | 8 | | | 38 | 14 |
| Thickening Time at 55° F. and 1500 psi (hr:min) | 10:10 | 8:27 | 7:27 | 5:31 | 4:25 | 3:38 | 2:55 |
| Initial consistency (Bc) | 12 | 20 | 12 | 25 | 17 | 12 | 10 |
| Time 30–100 Bc (hr:min) | 3:39 | 3:17 | 2:03 | 2:29 | 1:43 | 1:23 | 1:10 |
| UCA at 55° F. and 1500 psi | | | | | | | |
| Time to reach 50 psi (hr:min) | 15:50 | 13:42 | 10:17 | 8:56 | 7:35 | 6:34 | 5:46 |
| Time to reach 500 psi (hr:min) | N/A | N/A | 18:43 | 17:12 | 15:47 | 14:04 | 12:40 |
| Compressive strength at 24 hrs (psi) | 315 | 484 | 973 | 1050 | 1010 | 985 | 991 |
| API Fluid Loss at room temp. (mL/30 min.) | | | | | 14 | | |
| Vane rheometer test at 65° F. and 400 psi | | | | | | | |
| Time to reach 1550 psi (hr:min) | 6:20 | 5:10 | 4:10 | 3:30 | 2:30 | 2:00 | 1:30 |
| Time from 100 to 500 lbf/100 ft² (min) | 161 | 136 | 83 | 80 | 70 | 66 | 47 |

Table 3, and FIG. 1, show that gel strength transition time decreases with increasing concentration of the set admixture.

EXAMPLE 4

Effect of the Mixing Water

Cement slurries with a density of 16.4 ppg (1.96 g/cm³) were prepared with a Class H Portland cement. All formulations comprise a gas control additive (0.5 gal/sk), a dispersing agent (0.06 gal/sk) and 0.2 gal/sk of the set control additive of the present invention. As shown in Table 4 below, the slurry may be prepared either in fresh or seawater.

TABLE 4

| Mixing Water | Fresh | Sea |
|---|---|---|
| Rheology After mixing | | |
| PV (cP) | 49 | 51 |
| TY (lbf/100 ft²) | 3 | 16 |
| Rheology at 80° F. | | |
| PV (cP) | 53 | 61 |
| TY (lbf/100 ft²) | 5 | 17 |
| 10 minutes gel (lbf/100 ft²) | | 22 |
| Thickening Time at 55° F. and 1500 psi (hr:min) | 4:25 | 4:17 |
| Initial consistency (Bc) | 17 | 18 |
| Time 30–100 Bc (hr:min) | 1:43 | 1:53 |
| UCA at 55° F. and 1500 psi | | |
| Time to reach 50 psi (hr:min) | 7:35 | 7:43 |
| Time to reach 500 psi (hr:min) | 15:47 | 15:53 |
| Compressive strength at 24 hrs (psi) | 1010 | 1231 |
| API Fluid Loss at room temp. (mL/30 min.) | 14 | |
| Vane rheometer test at 65° F. and 400 psi | | |
| Time to reach 1550 psi (hr:min) | 2:30 | 2:20 |
| Time from 100 to 500 lbf/100 ft² (min.) | 70 | 67 |

EXAMPLE 5

Effect of the Fluid Loss Control Additive

Cement slurries with a density of 16.4 ppg (1.96 g/cm) were prepared with a Class H Portland cement. The formulations comprise a dispersing agent and a fluid loss control additive (a gas control additive being a fluid loss control additive). As shown in Table 5 below, the slurry properties are not impacted by the presence of a fluid loss control additive.

TABLE 5

| | | | | | |
|---|---|---|---|---|---|
| Set control additive (gal/sk) | 0.2 | 0.2 | 0.2 | 0.4 | 0.4 |
| Dispersant A (gal/sk) | 0.06 | 0.06 | 0.06 | 0.04 | 0.04 |
| Gas control additive (gal/sk) | — | 0.5 | — | 0.4 | — |
| Fluid loss control additive (gal/sk) | 0.5 | — | — | — | — |
| Rheology After mixing | | | | | |
| PV (cP) | 58 | 49 | 33 | 47 | 34 |
| TY (lbf/100 ft$^2$) | 4 | 3 | 1.4 | 9 | 4 |
| Rheology at 80° F. | | | | | |
| PV (cP) | 59 | 53 | 41 | 59 | 41 |
| TY (lbf/100 ft$^2$) | 2 | 5 | 4 | 16 | 14 |
| 10 minutes gel (lbf/100 ft$^2$) | | | 12 | 37 | 27 |
| Thickening Time at 55° F. and 1500 psi (hr:min) | 4:45 | 4:25 | 4:18 | 3:18 | 3:29 |
| Initial consistency (Bc) | 20 | 17 | 24 | 18 | 16 |
| Time 30–100 Bc (hr:min) | 1:48 | 1:43 | 1:21 | 1:53 | 1:51 |
| UCA at 55° F. and 1500 psi | | | | | |
| Time to reach 50 psi (hr:min) | 7:56 | 7:35 | 5:47 | | |
| Time to reach 500 psi (hr:min) | 15:48 | 15:47 | 13:17 | | |
| Compressive strength at 24 hrs (psi) | 1087 | 1010 | 1392 | | |
| API Fluid Loss at room temp. (mL/30 min.) | 31 | 14 | | 18 | 784 |
| Vane rheometer test at 65° F. and 400 psi | | | | | |
| Time to reach 1550 psi (hr:min) | 2:20 | 2:30 | 2:00 | | |
| Time from 100 to 500 lbf/100 ft$^2$ (min.) | 53 | 70 | 52 | | |

The compositions of the present invention are compatible with conventional gas control additives and fluid loss control additives, which contribute to minimal set retarding effects.

EXAMPLE 6

Effect of the Temperature

Cement slurries with a density of 16.4 ppg (1.96 g/cm$^3$) were prepared with a Class H Portland cement. The formulations comprise a dispersing agent and a fluid loss control additive at constant concentration. As shown in Table 6 below, increasing temperature provides decreased time between 30 and 100 Bc. The thickening time is also reduced with increased temperature.

TABLE 6

| BHCT | 55° F. | 80° F. | 130° F. |
|---|---|---|---|
| Thickening Time at 1500 psi (hr:min) | 4:25 | 2:15 | 1:48 |
| Time 30–100 Bc (hr:min) | 1:43 | 0:30 | 0:20 |

EXAMPLE 7

Tests with Class A Cement

Tests similar to those performed with Class H cement were carried out using a Portland Class A cement. Slurries with a density of 15.6 ppg (1.86 g/cm$^3$), were prepared including a dispersing agent and a fluid loss control additive at constant concentration. Results are shown in Table 7 below.

TABLE 7

| | | | | | |
|---|---|---|---|---|---|
| Set control additive (gal/sk) | 0 | 0.1 | 0.2 | 0.3 | 0.4 |
| Thickening Time at 65° F. and 1500 psi (hr:min) | 8:31 | 5:03 | 4:15 | 4:11 | 3:58 |
| Initial consistency (Bc) | 18 | 25 | 18 | 18 | 16 |
| Transition Time 30–100 Bc (hr:min) | 4:27 | 2:21 | 1:51 | 2:01 | 1:44 |
| UCA at 55° F. and 1500 psi | | | | | |
| Time to reach 50 psi (hr:min) | 13:37 | 10:00 | 7:12 | 5:40 | 5:30 |
| Time to reach 500 psi (hr:min) | 22:31 | 16:21 | 13:38 | 10:50 | 10:40 |
| Compressive strength at 24 hrs (psi) | 661 | 1170 | 1333 | 1343 | 1318 |
| Vane rheometer test at 65° F. and 400 psi | | | | | |
| Time to reach 1550 psi (hr:min) | | 3:40 | | | 2:40 |
| Time from 100 to 500 lbf/100 ft$^2$ (min.) | | 61 | | | 43 |

The set control additive of the present invention is compatible with Class A cement, as well as with Class H and Class G cement typically used for well cementing.

EXAMPLE 8

Gel Strength Development

Figure 2:
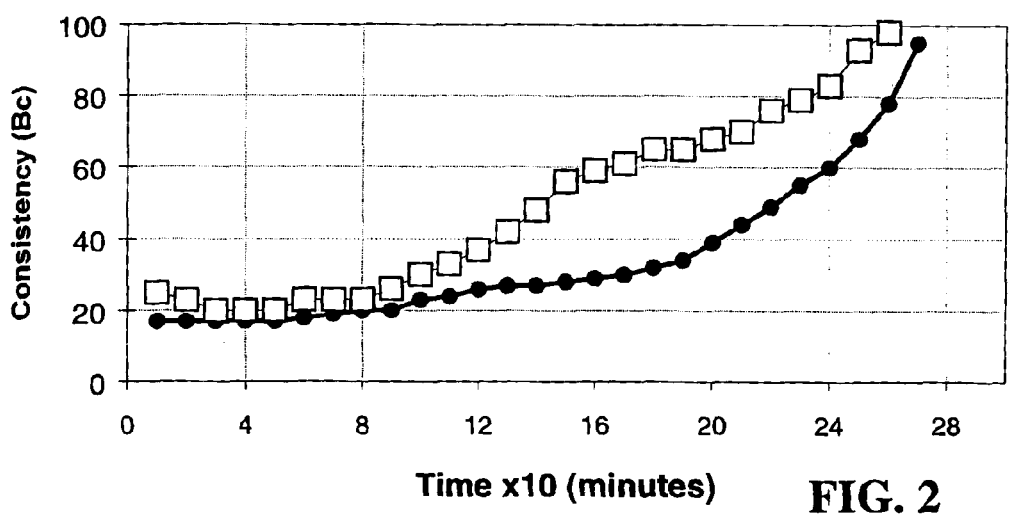
FIG. 2 shows the consistency development at 65° F., as a function of time, of a cement composition according to the present invention and of a composition according to the prior art.

FIG. 2 shows a plot of the development of consistency at 65° F. as a function of time for a cement composition according to the present invention (filled circle marks) and according to the prior art, using calcium chloride as set accelerator (open square marks). Both compositions have been fully optimized and comprise a fluid loss control agent and a dispersing agent. The slurry density for both compositions is 16.4 ppg (1.96 g/cm$^3$).

Even though both set accelerators provide about the same thickening time, the compositions of the present invention present a much right-angle profile, which is extremely advantageous in reducing the risk of gas migration.

EXAMPLE 9

Compressive Strength of Foamed Slurries

A base slurry having a density of 16.4 ppg (1.96 g/cm$^3$) was prepared with a Class H Portland cement. The composition is optimized for well cementing and comprises a fluid loss control additive, a dispersing agent, a foaming agent and a foam stabilizer.

The composition is foamed at 12 ppg (1.43 g/cm$^3$). A compressive strength of 614 psi is achieved after 24 hours at 70° F., compared to a right-angle cement design according to the prior art of only 350 psi.

EXAMPLE 10

Comparison in CRETE Slurry

The formulations of the present invention may also comprise sized particulates including silica compounds, pozzolans and glass or ceramic beads of various densities, such as those described in co-pending U.S. application Ser. No. 09/831,671, which is based on International Patent application WO 00/29351, and is hereby incorporated by reference.

Two slurries were prepared based on a solid blend consisting (by volume) of 39% Class H cement, having a mean size of about 40 microns, 53% hollow spheres taken from cenospheres having an average size of 150 microns (specific gravity 0.75), and 8% of a mixture of Portland micro-cement and slag having a mean size of about 3 microns micro-cement. The slurry further comprises a dispersing agent and an anti-foam agent. To a first slurry prepared according to the prior art, calcium chloride is added at a concentration of 1% by weight of cement. To a second slurry prepared according to the present invention, the set admixture B of Example 1 is added at a concentration of 0.2 gallon/sk of cement. Results are shown in Table 8 below.

TABLE 8

|  | Prior art | Invention |
|---|---|---|
| Density (ppg) | 12.4 | 12.5 |
| Rheology After mixing |  |  |
| PV (cP) | 99 | 100 |
| TY (lbf/100 ft$^2$) | 22 | 17 |

TABLE 8-continued

|  | Prior art | Invention |
|---|---|---|
| Rheology at 50° F. |  |  |
| PV (cP) | 150 | 133 |
| TY (lbf/100 ft$^2$) | 23 | 25 |
| Thickening Time at 50° F. and 1500 psi (hr:min) | 4:58 | 4:25 |
| Initial consistency (Bc) | 16 | 16 |
| Transition Time 30–100 Bc (hr:min) | 2:41 | 3:00 |
| UCA at 50° F. and 1500 psi |  |  |
| Time 50 psi (hr:min) | 6:27 | 6:40 |
| Time 500 psi (hr:min) | 12:04 | 12:34 |
| Compressive strength at 24 hrs (psi) | 1546 | 1161 |
| Compressive strength at 48 hrs (psi) | 2500 | 2156 |
| Vane rheometer test at 50° F. and 400 psi |  |  |
| Time to reach 1550 psi (hr:min) | 2:00 | 1:30 |
| Time from 100 to 500 lbf/100 ft$^2$ (min.) | 54 | 34 |

The formulations of the present invention are compatible with this type of slurry and gel strength development measured at downhole temperature and under pressure is improved, resulting in shorter transition time from 100 to 500 lbf/100 ft$^2$.

What is claimed is:

1. A method for preventing water flows during the cementing of a borehole which penetrates a subterranean formation wherein the temperature of said formation is in the range of from about 40° F. to about 75° F., said method comprising forming a slurry of hydraulic cement in water, placing said slurry in said borehole adjacent said formation and permitting said slurry to set in said borehole; and wherein said slurry is comprised of water, hydraulic cement, a dispersant, and a set-accelerating admixture comprising an alkali or alkaline earth metal nitrate and an alkali or alkaline earth metal nitrite, wherein the slurry gel strength transitions from 100 to 500 lbf/100 ft$^2$ in a time period of up to about 90 minutes.

2. The method of claim 1, wherein said set-accelerating admixture comprises calcium nitrate and calcium nitrite salts in a weight ratio of from about 1:3 to about 3:1.

3. The method of claim 2, wherein said set-accelerating admixture comprises calcium nitrate and calcium nitrite salts in a weight ratio of about 1:1.

4. The method of claim 1, wherein said set-accelerating admixture further comprise glycols.

5. The method of claim 4, wherein said glycols are C2 to C6 aliphatic di- or tri-hydric glycols.

6. The method of claim 5, wherein said glycol is diethylene glycol.

7. The method of claim 1, wherein said set-accelerating admixture further comprise alkanolamines.

8. The method of claim 7, wherein said alkanolamines are selected from the group consisting of compounds having the formula:

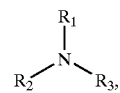

where R1 and R2 are hydroxyalkyl groups in C1–C4, and R3 is a C1–C5 alkyl groups.

9. The method of claim 8, wherein said alkanolamine is selected from the group consisting of methyl and ethyl diethanolamine.

10. The method of claim 1, wherein said set-accelerating admixture consists of calcium nitrate, calcium nitrite, diethylene glycol, methyldiethanolamine and calcium bromide in a proportion of 42:42:10:3:3 by weight in water, with a solid content between 45 and 50%.

11. The method of claim 1, wherein said set-accelerating admixture is added to the cement composition in an amount that provides a total salt in the range of about 3 to about 20 g per kg of cement.

12. The method of claim 10, wherein said set-accelerating admixture is added to the cement composition at a concentration of about 4 to about 45 cm$^3$ per kg of cement.

13. A method for preventing water flows during the cementing of a borehole which penetrates a subterranean formation wherein the temperature of said formation is in the range of about 40° F. to about 75° F., said method comprising forming a sluny of hydraulic cement in water, said slurry having increased gel strength development, a reduced gel time and a density ranging between 0.9 and 3 g/cm$^3$, placing said slurry in said borehole adjacent said formation and permitting said slurry to set in said borehole; and wherein said slurry is comprised of water, hydraulic cement, a dispersant, and a set-accelerating mixture comprising an alkali or alkaline earth metal nitrate and an alkali or alkaline earth metal nitrite, wherein said slurry further comprises at least one additive selected from the group consisting of fluid loss control additives, and gas migration control additives, wherein the slurry gel strength transitions from 100 to 500 lbf/100 ft$^2$ in a time period of up to about 90 minutes.

14. The method of claim 1, wherein the setting temperature is in the range 40° F. to 70° F.

15. The method of claim 13, wherein said set-accelerating admixture consists of calcium nitrate, calcium nitrite, diethylene glycol, methyldiethanolamine and calcium bromide in a proportion of 42:42:10:3:3 by weight in water, with a solid content between 45 and 50%.

16. The method of claim 15, wherein said set-accelerating admixture is added to the cement composition at a concentration of about 4 to about 45 cm$^3$ per kg of cement.

17. The method of claim 13 wherein said slurry comprises a fluid loss control agent and a dispersing agent.

18. The method of claim 13 wherein said slurry further comprising sized particulates.

19. A method for preventing water flows during the cementing of a borehole which penetrates a subterranean formation wherein the temperature of said formation is in the range of from about 40° F. to about 75° F., said method comprising forming a slurry of hydraulic cement in water, placing said slurry in said borehole adjacent said formation and permitting said slurry to set in said borehole; and wherein said slurry is comprised of water, hydraulic cement, a dispersant, a set-accelerating admixture comprising an alkali or alkaline earth metal nitrate and an alkali or alkaline earth metal nitrite, and sized particulates, wherein the slurry gel strength transitions from 100 to 500 lbf/100 ft$^2$ in a time period of up to about 90 minutes.

* * * * *